United States Patent
O'Gorman et al.

(10) Patent No.: US 6,711,178 B1
(45) Date of Patent: Mar. 23, 2004

(54) ENHANCED CLAW PACKING PROTOCOL

(75) Inventors: Robert O'Gorman, Raleigh, NC (US); Dean Hiller, Shrub Oak, NY (US); Mark C. Drummond, Catonsville, MD (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/149,719

(22) Filed: Sep. 8, 1998

(51) Int. Cl.$^7$ ................................................. H04J 3/24
(52) U.S. Cl. ........................................ 370/473; 370/393
(58) Field of Search ................................. 370/473, 393, 370/356, 437, 438, 439, 471, 351, 352, 354, 389, 391, 392; 709/227, 228, 203, 238, 208, 209, 230, 231, 232, 236, 245, 246; 710/131, 100

(56) References Cited

U.S. PATENT DOCUMENTS

| | | | |
|---|---|---|---|
| 5,014,265 A | 5/1991 | Hahne et al. ................. 370/60 |
| 5,072,449 A | 12/1991 | Enns et al. ................. 371/37.1 |
| 5,128,945 A | 7/1992 | Enns et al. ................. 371/37.1 |
| 5,260,936 A | 11/1993 | Bardet et al. ................. 370/61 |
| 5,280,470 A | 1/1994 | Buhrke et al. ................. 370/13 |
| 5,341,478 A | 8/1994 | Travis, Jr. et al. .......... 395/200 |
| 5,386,512 A | 1/1995 | Crisman et al. ............ 395/200 |
| 5,430,842 A | 7/1995 | Thompson et al. ......... 395/200 |
| 5,481,542 A * | 1/1996 | Logston et al. ............. 370/442 |
| 5,491,802 A | 2/1996 | Thompson et al. .... 395/200.18 |
| 5,546,549 A | 8/1996 | Barrett et al. ................ 395/309 |
| 5,555,374 A | 9/1996 | Armerding et al. ..... 395/200.02 |
| 5,600,637 A * | 2/1997 | Kikuta ........................ 370/389 |
| 5,621,894 A | 4/1997 | Menezes et al. ........ 395/200.12 |
| 5,632,021 A | 5/1997 | Jennings et al. ............ 395/309 |
| 5,636,371 A | 6/1997 | Yu .............................. 395/500 |
| 5,663,952 A | 9/1997 | Gentry, Jr. ................... 370/252 |
| 5,699,532 A | 12/1997 | Barrett et al. ................ 395/309 |
| 5,764,887 A | 6/1998 | Kells et al. .................. 395/186 |
| 5,946,313 A * | 8/1999 | Allan et al. .................. 370/397 |
| 5,964,831 A | 10/1999 | Kearns et al. ............... 709/201 |
| 5,991,797 A * | 11/1999 | Futral et al. ................. 709/216 |
| 6,006,264 A * | 12/1999 | Colby et al. ................. 709/226 |
| 6,028,860 A * | 2/2000 | Laubach et al. ........ 370/395.64 |
| 6,157,635 A * | 12/2000 | Wang et al. .................. 370/352 |
| 6,275,494 B1 * | 8/2001 | Endo et al. ............. 370/395.52 |
| 6,343,322 B2 * | 1/2002 | Nagami et al. .............. 709/227 |
| 6,381,240 B1 * | 4/2002 | Muto .......................... 370/389 |
| 6,452,915 B1 * | 9/2002 | Jorgensen .................... 370/338 |

* cited by examiner

*Primary Examiner*—Phirin Sam
(74) *Attorney, Agent, or Firm*—Cesari and McKenna, LLP

(57) ABSTRACT

An enhanced CLAW protocol supports the transfer of multiple data types from different sockets/sessions within a single channel operation between a host mainframe and a control unit of a computer network. Multiple sublinks are created under a single packed CLAW logical link, wherein each sublink may transport a uniquely identifiable data type as a message from a socket/session. The messages are then concatenated within a single CLAW data block for transfer over a channel coupling the host and control unit. In addition, the invention increases the maximum size of the CLAW block for each channel operation.

39 Claims, 6 Drawing Sheets

ENHANCED CLAW PACKING PROTOCOL

CROSS-REFERENCE TO RELATED APPLICATIONS

This invention is related to the following U.S. Patent Applications:

U.S. patent application Ser. No. 08/920,714 titled, Option Request Protocol, filed Aug. 29, 1997;

U.S. patent application Ser. No. 08/921,158 titled, IP Checksum Offload, filed Aug. 29, 1997; and U.S. patent application Ser. No. 08/920,713 titled, Method and Apparatus for Dynamic Link Name Negotiation, filed Aug. 29, 1997.

FIELD OF THE INVENTION

The present invention relates to computer networks and, more specifically, to a system and method for transferring multiple data types within a single operation in a computer network.

BACKGROUND OF THE INVENTION

Data communication in a computer network involves the exchange of data between two or more entities interconnected by communication links. The entities are typically software programs executing on hardware computer platforms, such as nodes; in particular, communication software executing on the nodes correlate and manage data communication with other nodes. The nodes typically communicate by exchanging discrete packets or frames of data according to predefined protocols. In this context, a protocol consists of a set of rules defining how the nodes interact with each other. Collectively, these hardware and software components comprise a communications network and their interconnections are defined by an underlying architecture.

Modem communications network architectures are typically organized as a series of hardware and software levels or "layers" within each node that interact to format data for transfer over the network. Predetermined services are performed on the data as it passes through each layer and the layers communicate with each other by means of the predefined protocols. The lower layers of these architectures are typically implemented in hardware and firmware, whereas the higher layers are generally implemented in the form of software running on the nodes attached to the network. Examples of such communications architectures include the the Internet communications architecture and the Systems Network Architecture (SNA) developed by International Business Machines (IBM) Corporation.

SNA is a mainframe-oriented network architecture that includes services generally similar to those defined in the Internet communications architecture. An SNA network consists of nodes and links, wherein the nodes are network components containing protocol implementations and the links are transmission facilities that carry data between two nodes configured to operate a data link control procedure. Examples of such nodes include a host mainframe computer, a control unit and an input/output (I/O) device that is provides a user interface to the network. In one embodiment of the SNA network, the control unit and I/O device may be combined within a node, such as a workstation, and in another embodiment, the control unit may be independent of the workstation and include a router to enable routing of data through the network to destination nodes, such as computers and/or workstations functioning as end stations.

The host is typically connected to the control unit through a high-performance communication subsystem called a mainframe channel. The channel comprises a plurality of components including an intelligent processor (i.e., channel CPU) that manages the protocol over a communications link and controls transfer of data between host (main memory) storage and I/O devices directly attached to the control unit. To that end, a channel may use one or more channel paths as the actual links between a host and the control unit. Channel paths include physical transmission links between the channel and control unit; examples of channel paths include bus-and-tag and enterprise system connection (ESCON) channel paths. Moreover, each I/O device is represented by a subchannel. A subchannel is similar to a virtual circuit in that it provides information about the associated I/O device and its attachment to the channel.

To transfer data in connection with an I/O operation, the channel CPU executes channel command words (CCWs) once started by a start subchannel operation. The start subchannel command is issued by the host CPU to instruct the channel CPU as to the location of a channel program; this command also specifies the subchannel on which the channel program should execute. The software entity within the host mainframe that creates the channel program is a Tranmission Control Protocol/ Internet Protocol (TCP/IP) process, which is schematically illustrated as layers of a typical Internet communications protocol stack. Protocol stacks and the TCP/IP reference model are well-known and are, for example, described in *Computer Networks* by Andrew S. Tanenbaum, printed by Prentice Hall PTR, Upper Saddle River, N.J., 1996.

The channel program consists of a collection of CCWs; the CCWs are the actual I/O commands (read, write, status, etc) that cause information to flow between the host and an I/O device. The control unit interprets these CCWs and adapts them to fit the characteristics of different I/O devices. Upon issuing a start subchannel operation, the host CPU is released to pursue other processing while the channel organizes the data referenced by the channel program and synchronizes its transfer between the I/O device and main memory.

Communication between a channel and control unit is typically governed by various protocols; a protocol originally developed by IBM Corporation for improving the efficiency of data communication between a host computer and a control unit is the common link access to workstation (CLAW) protocol. CLAW is a mainframe channel protocol that is not used with medium access control addressing and, thus, is generally used to send IP packets (in IP datagram mode) or TCP-socketed traffic, such as socket requests and responses (in IP socket offload mode).

A socket is essentially an interface between an application layer and transport layer of a protocol stack that enables the transport layer to identify which process it must communicate with in the application layer. For example, a socket interfaces to a TCP/IP protocol stack via a set of application programming interfaces (API) consisting of a plurality of entry points into that stack. Applications that require TCP/IP connectivity typically utilize the socket API to interface into the TCP/IP stack. For a connection-oriented protocol such as TCP, the socket may be considered a session; however, for a connectionless protocol such as IP datagram using the User Datagram Protocol (UDP), the socket is an entity/handle that the networking software (protocol stack) uses to uniquely identify an application layer end point, typically through the use of port numbers. The socket offload protocol provides such a socket interface.

In a CLAW environment, the control unit is coupled to a CLAW device, which is a software entity executing on a node, such as a workstation; in many CLAW implementations, the control unit and workstation are combined within the control unit. Data communication takes place over a channel via the exchange of data packets between the control unit and host. The CLAW protocol achieves data communication efficiency, in part, by avoiding host CPU interrupts during I/O channel operations through the continuous execution of channel programs over two subchannels: one for write operations and one for read operations.

Two CLAW devices are typically spawn within the control unit to interface with the host mainframe: one process (the write device) that controls write operations over the write subchannel and the other process (the read device) that controls read operations over the read subchannel. Data received from the network is typically provided to the read device and data arriving from the channel interrupt routine is provided to the write device. The host generally does not have corresponding processes for these two devices; rather it has control block structures that are specific to each device and that contain state information about the status of the devices.

Logical links are defined in CCWs for read and write operations to establish multiple logical connections within each subchannel directed to different applications executing on the host and control unit. In fact, a main goal of the CLAW protocol is to enable efficient switching among applications specified by the logical links to facilitate data transfers to appropriate outbound interfaces (e.g., FDDI or Ethernet). Accordingly, the logical links are a way to multiplex within a subchannel.

The CLAW protocol generally defines (i) command codes associated with CCWs and (ii) the order in which those command codes are specified in a CCW chain. A logical link number (0–31) is embedded in the CCW command code, wherein number 0 is reserved for a control link and numbers 1–31 specify application-to-application (data) links. The control link path is part of a read/write subchannel pair dedicated to CLAW protocol communication. The host CPU builds a channel program comprising a chain of CCW data structures in main memory that contain instructions (e.g., read, read header, status modifier (SMod), write). These instructions are then executed in accordance with the CLAW protocol.

The CLAW protocol also defines two primary sets of control flows over the control link: system validate/system validate response and connection establishment sequences. These CLAW connection protocol flows are well-known and described in AIX Version 3.2, *Enterprise Systems Connection Adapter: User's Guide and Service Information*, IBM, 1993. Broadly, stated, the system validate/system validate response control flows are manifested as message packets that propagate over the control link, passing information as data within a predetermined packet format. Before sending data, a system validate/response message flow occurs over the control link to verify the names of the control unit and host.

The control unit and host names are configuration parameters used to ensure that the host is communicating with a proper control unit application. If the control unit (or host) name contained in the system validate message is incorrect, a control application provides a non-match return code in the system validate response message along with the expected name. Upon completion of the system validate/response exchange, the control link (0) is established and the host is "aware" of the application to which it is connected.

However, logical data links still need to be established for application-to-application data communication.

In order to establish a data link between two communicating applications, a connection request sequence is executed between the host and control unit. A control application resident on the host is typically responsible for initiating the connection request sequence to establish logical links (1–31) for data transfers between applications. A logical link is essentially a means for classifying the type of data transferred between the host and control unit. A channel adapter within the control unit controls logical link assignments for applications executing on the unit. The connection request sequence operates to establish the actual links used for host application-to-control unit application data transfers; once established, various types of data flow over these application-application links (e.g., a TCP/IP application has IP packets flowing over the link). The CCW for each CLAW operation defines the logical link and the logical link, in turn, defines the type of data; however, only a single type of data is supported for each channel operation.

For host originated connections, the connection request originates in the host over control link 0 and is sent to the channel adapter which selects an available link and alters the connection request to reference that link. The adapter then passes the connection request onto the targeted application of the control unit. The channel adapter sends the connection response back to the host over the control link. If the control unit does not agree with the name of its application specified in the request, it returns a disconnect command; otherwise, a connection confirm response is provided to the host and the link is ready for data transfer.

The host CPU then issues a start subchannel (SSCH) command to the channel CPU instructing that latter CPU to initiate an I/O operation to the targeted application. The channel CPU executes the SSCH command, which points to the beginning of a CCW chain of a channel program in main memory. In the case of a read (or write) channel program, the channel CPU gains control of the program, reads each CCW in sequence and executes it to initiate the flow of data (IP packets), along with the CCW command code, over the physical channel interface wire and through the control unit to the targeted application.

The size of an IP packet is limited to a maximum transfer unit (MTU) size of the channel interface. Typically, the MTU for the interface is 4096 (4K) bytes and the maximum amount of data of a CLAW read/write operation is 4K bytes. Thus, each data block handled by the CLAW protocol (i.e., a CLAW data block) contains one IP packet that is limited in size by an MTU of 4K bytes. If it is necessary to send blocks of data that are larger than 4K bytes using the CLAW protocol, the blocks may be chained together by a "more-to-come" indicator.

For example, the CLAW protocol may be employed to transmit TCP-socketed data traffic in accordance with an IP socket offload implementation. The data is organized as 4K byte socket offload request/response messages that are linked together with the more-to-come indicator to create a logical chain of data. A socket header is located at the beginning of the entire "more-to-come chain" of offload messages and defines the user application for the chained data. However, each individual offload message originates at the same socket. A high level overview of the IP socket offload protocol is described in *IBM TCP/JP for MVS: Offloading TCP/IP Processing*, Version 3, Release 2, IBM 1992, 1997.

The minimum number of CCWs needed to read an IP packet includes a read operation of the CLAW data block, a read operation of the CLAW header and a SMod operation. The actual data of the packet is read during the read operation of the 4K byte CLAW block; all other operations (such as read header, SMod and read FF operations, the latter of which invokes an interrupt) are overhead. Accordingly, an objective is to avoid additional overhead operations, such as the read FF operation.

For each received CCW command code, the control unit responds with either "Yes", "Invalid Command" or "Busy". A yes response is followed by execution of the CCW command. Either the channel or the control unit can terminate an I/O channel operation. Termination implies that the targeted application has received or provided all data associated with the I/O operation and no longer requires channel facilities. Control unit initiated I/O termination indicates that the channel operation has completed and the control unit is ready to execute another operation.

As noted, the CCWs generally define channel processing and, indirectly, activity on the physical interface medium. Depending on the type of interface, particular messages are exchange over the wires coupling the host mainframe and control unit. In the case of an ESCON interface, for example, there are a number of specific frames that flow over the physical interface medium when the channel CPU executes CCWs associated with a write operation. The ESCON frames comprise (i) a command frame including a write operation, (ii) a command response frame which is an acknowledgment that the frame is valid, and (iii) an accept command response frame which is used in the event of an error in the command response frame. Thereafter, data frames flow from the mainframe to the write device of the control unit followed by data request frames from the control unit to the mainframe.

In general, it takes approximately 200 microseconds to transfer only the data frames of a 4K byte CLAW data block at a signaling rate of 200 megahertz (MHz). In addition, the overhead associated with the non-data frame exchanges may consume approximately 80 microseconds for a subtotal of 280 microseconds to complete the actual write operation. Yet, there is also the read FF operation associated with the CCW program directed to the write device, which operation requires approximately 50 microseconds of "pure overhead" to transfer 1 byte of information. Thus, the write channel operation requires 130 microseconds of overhead and 200 microseconds of data transfer, or approximately 40 percent of bandwidth consumed by overhead.

The overhead associated with the read device channel program is greater because there is a minimum of three (3) operations required: two read operations and one write operation (the SMod operation). Using the same generalization as in the write channel operation, the read data operation takes approximately 50 microseconds, the read header operation takes approximately 50 microseconds and the SMod operation takes approximately 80 microseconds for a total of 180 microseconds for every 200 microseconds of data transfer. This results in approximately 50 percent of bandwidth attributable to ESCON and CLAW overhead.

In both cases described above, it is assumed that the data transfers occurred at 4K byte optimal lengths, resulting in 200 microseconds of data transfer for either 130 or 180 microseconds of overhead. A practical situation involves IP datagram mode and, in particular, the use of TCP acknowledgments (ACKs), each of which comprises 64 bytes of data. For this less optimal case, 3.2 microseconds of data transfer is required to send the ACK. Again, either 180 or 130 microseconds of overhead is required for the 3.2 microsecond data transfer, resulting in approximately 90 to 98 percent of bandwidth consumed with ESCON and CLAW overhead. The present invention is directed to substantially increasing the data-to-overhead transfer ratio or, in other words, substantially lowering the percentage of bandwidth consumed by ESCON and CLAW overhead.

SUMMARY OF THE INVENTION

The invention relates to an enhanced CLAW packing protocol that supports the transfer of multiple data types from different sockets/sessions within a single channel operation between a host mainframe and a control unit of a computer network. According to the invention, multiple logical sublinks are created under a single packed CLAW logical link, wherein each sublink may transport a uniquely identifiable data type as a message from a socket/session. The messages are then concatenated within a single CLAW data block for transfer over a channel coupling the host and control unit. In addition, the invention increases the maximum size of the CLAW block for each channel operation.

Specifically, the enhanced CLAW packing protocol defines sublink 0 for transporting novel packed control messages used to establish non-zero sublinks, each of which may transport a packed data message of a particular data type within the same channel operation. Where the conventional CLAW protocol allows the transfer of only one message, such as an Internet protocol (IP) datagram, of a particular data type (e.g., either checksummed or non-checksummed) per CLAW block, the enhanced CLAW packing protocol described herein allows the transfer of multiple IP datagrams of various data types (checksummed, non-checksummed and/or any other data type) within the same block. The enhanced protocol also extends the maximum CLAW block size from, e.g., 4K bytes to 64K (actually 64K−1) bytes for each channel operation.

In the illustrative embodiment, the packed CLAW link is established in connection with conventional CLAW initialization procedures, such as system validation and connection request flows. Upon formation of the packed link, a packing control sublink is provided for exchanging the packed control messages between the host and control unit. The enhanced protocol manifests as an exchange of these packed control messages to further establish the sublinks "underneath" the packed link. Thereafter, data is transferred over the packed CLAW link as a series of packed data messages within a packed CLAW block.

According to an aspect of the present invention, the packed data message embodies a novel format including a header, data and padding. The padding terminates the packed data message in a manner that enables the header of a next packed message to assume a "natural" alignment. The header comprises a length field that specifies a boundary of the packed message to thereby distinguish the message from other packed messages of the CLAW block. The header further comprises a sublink field containing a sublink number that identifies a particular type/logical link of the data carried in the message. The novel packed data message format allows independent processing of each of the concatenated messages regardless of whether the messages originate from different socket/sessions and contain different data types within/without those sockets/sessions.

Advantageously, the invention enhances the CLAW protocol to enable concatenation of multiple messages from different sockets/sessions into a single channel block for transfer over the channel to thereby reduce overhead on the channel for the total number of transferred messages.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
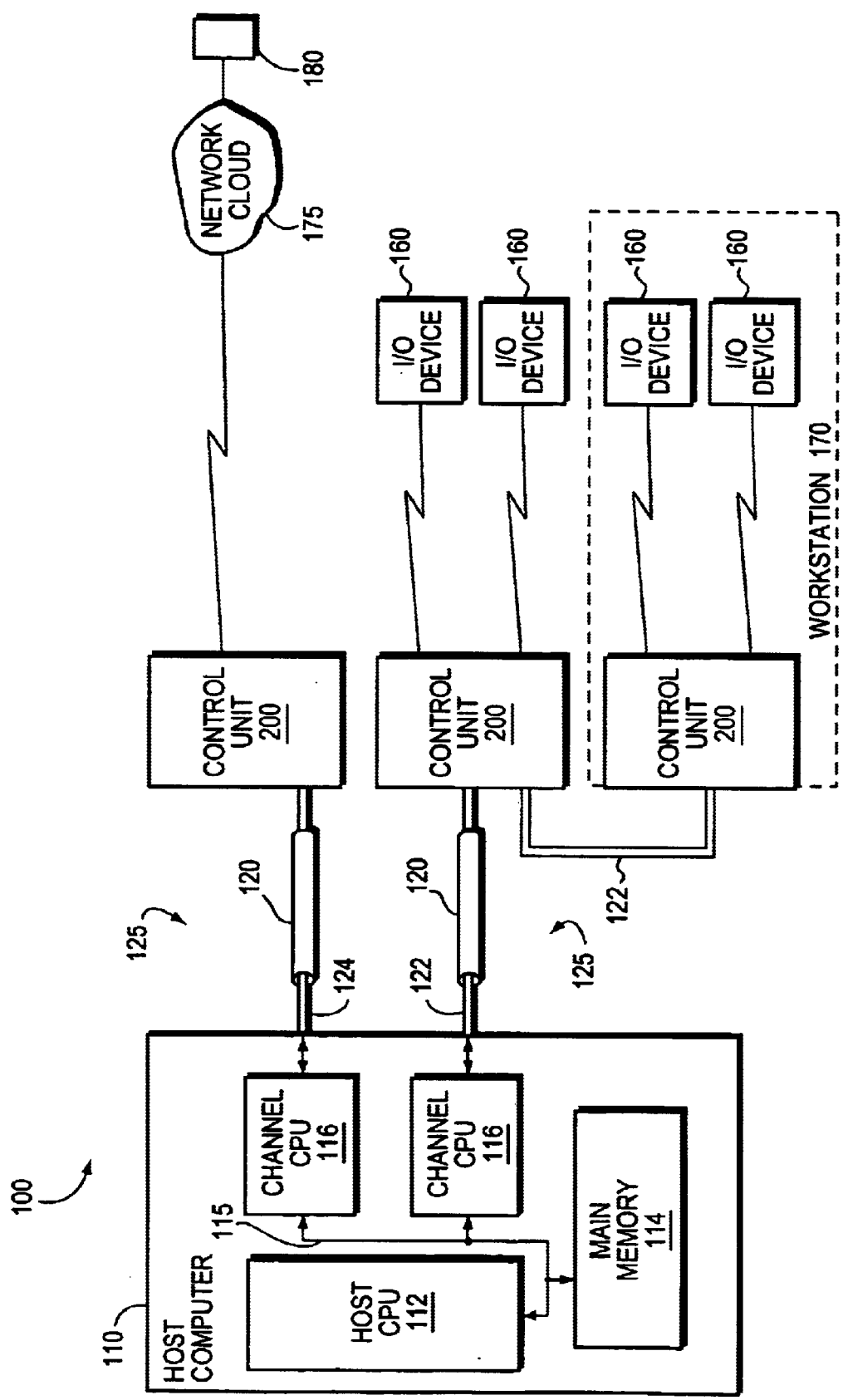
FIG. 1 is a block diagram of a computer network comprising a collection of inter-connected nodes, such as a host computer and at least one control unit.

FIG. 1 is a block diagram of a computer network 100 comprising a collection of interconnected nodes, such as a host computer 110 and at least one control unit 200. The host computer comprises a host central processing unit (CPU 112), a main memory 114 and at least one channel CPU 116 interconnected by a bus 115. Communication link 120 couples the channel CPU 116 to the control unit 200 which, in turn, may be directly attached to input/output (I/O) devices 160. In an embodiment of the network 100 that may be advantageously used with the invention, the control unit and I/O devices may be combined within an integrated node, such as a workstation 170. In the illustrative embodiment described herein, however, the control unit 200 is an independent node comprising, inter alia, a router for routing data through the network to an end station 180 via a network (e.g., SNA or IP) cloud 175. Communication among the nodes is typically effected by exchanging discrete frames or packets of data according to predefined protocols.

For each node, the memory may comprise storage locations addressable by the CPUs for storing software programs and data structures associated with the inventive protocol and messages. Moreover, the CPUs may comprise processing elements or logic for executing the software programs and manipulating the data structures. An operating system, portions of which are typically resident in memory and executed by the CPU, functionally organizes the node by, inter alia, invoking network operations in support of software processes executing on the node. It will be apparent to those skilled in the art that other CPU and memory means, including various computer readable media, may be used for storing and executing program instructions pertaining to the inventive techniques described herein.

The channel CPU and communication link collectively interact to form a mainframe channel 125 to effectively separate execution of I/O channel operations from the host computer's execution of data processing programs. Each I/O device 160 is represented by a subchannel (not shown) that provides information about the I/O device and its attachment to the channel 125. Functionally, the channel CPU 116 manages the protocol over the communication link 120 and controls transfer of data directly between main memory 114 and the control unit 200. To that end, the channel CPU may use one or more logical and physical links of the channel 125 as paths between the host and the control unit. Examples of a physical transmission link include a bus-and-tag path 122 and an enterprise system connection (ESCON) path 124.

The bus-and-tag channel path 122 is a byte-wide parallel bus with data on one cable (the "bus") and a set of control lines on another cable (the "tag"). The control lines govern the transfer of control information and data over the parallel bus. For this path implementation, each channel is connected to a first control unit in a chain consisting of 1 to 8 control units. The chain acts as a bus, connecting each channel to a series of control units. The ESCON channel path 124, on the other hand, consists of a pair of fiber optic cables that employ a serial, packet-switching architecture with control information such as packet framing and cyclic redundancy check (CRC) characters. Standard bus-and-tag protocol indications are conveyed within packets instead of through bus-and-tag lines.

Figure 2:
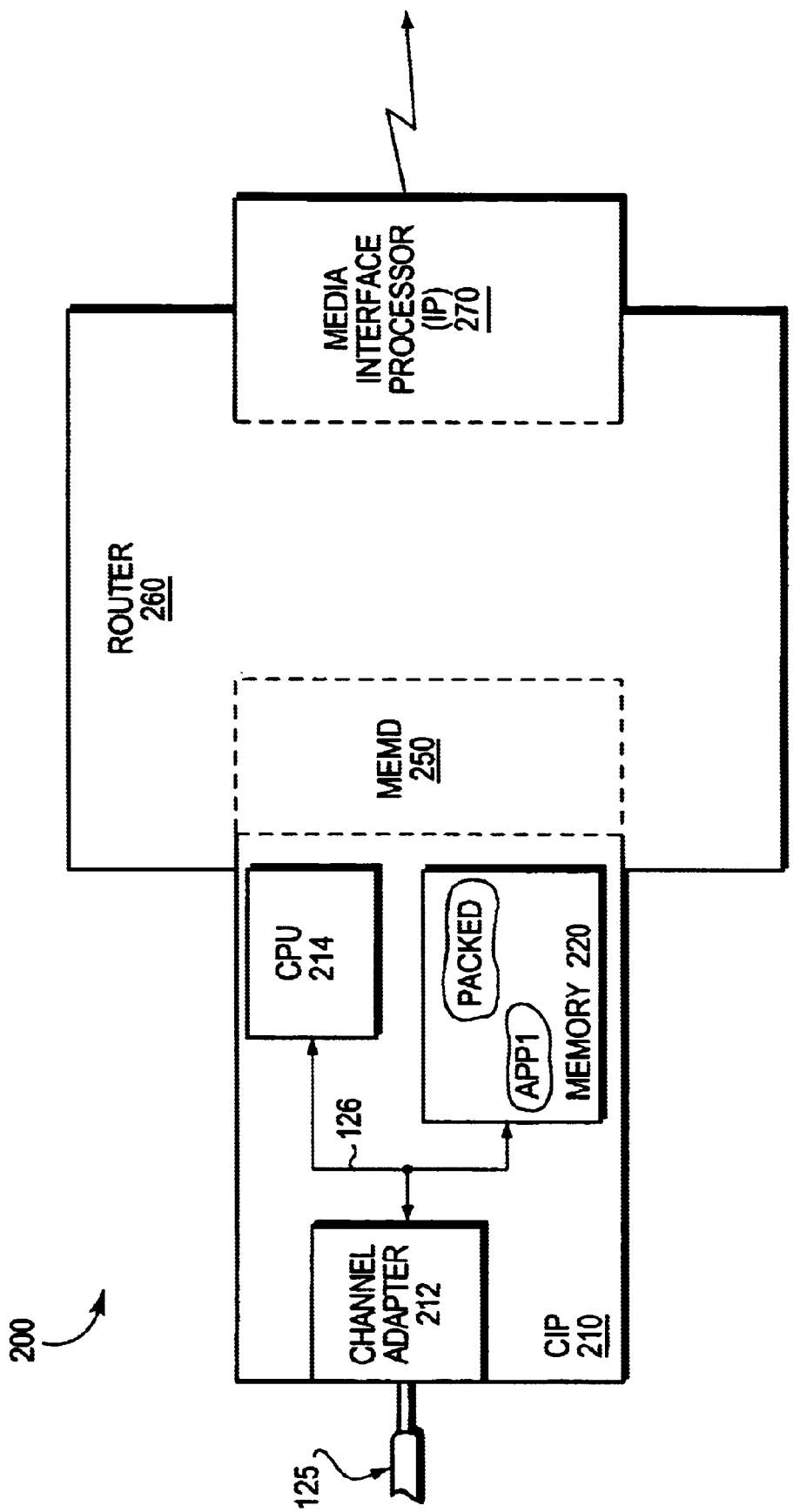
FIG. 2 is a block diagram of the control unit of FIG. 1.

FIG. 2 is a block diagram of an illustrative embodiment of the control unit 200 comprising an inbound or channel interface processor (CIP) 210, a memory switching fabric (MEMD) 250, a router 260 and an outbound or media interface processor (IP) 270. The IP 270 provides an outbound interface connection to a plurality of different wide area and local area network media (e.g., token ring, FDDI and Ethernet) to enable transfer of data packets over those media. The router 260 is configured to facilitate the flow of the data packets throughout the network by routing them to proper destination nodes.

The CIP 210 provides high-performance, multiprotocol network access to the host computer 110 and, to that end, includes a channel adapter 212 that directly couples to the channel 125 and, in particular, to the physical bus-and-tag (parallel) and ESCON channel paths. The CIP is a control unit platform within the Cisco mainframe channel connection (CMCC) family of platforms, available from Cisco Systems, Inc., that support a connection back to the host mainframe. It should be noted that other control unit platforms may be advantageously used with the present invention; one such platform from the CMCC family is the channel port adapter (xCPA), wherein x denotes either the ESCON channel port adapter (ECPA) or the parallel channel port adapter (PCPA).

A CPU 214 and memory 220 of the CIP cooperate with the channel 125 to relieve the host 110 from tasks associated with direct communication with destination nodes, such as workstations and end stations, thereby saving host resources while allowing concurrent data and I/O processing. Control and application programs stored in the memory 220 communicate with respective programs in the host via the exchange of, e.g., Internet protocol (IP) data packets in accordance with a protocol, such as the common link access to workstation (CLAW) protocol.

The CLAW protocol generally defines command codes associated with channel command words (CCWs); logical links are defined in CCWs for read and write operations to establish multiple logical connections within subchannels directed to different applications executing on the host and CIP. The protocol enables efficient switching among applications specified by these logical links to facilitate data transfers to appropriate outbound media through the IP 270. Logical link number 0 is reserved for a control link over which system validate and system validate response messages flow to verify the names of the CIP and host. Logical link numbers 1–31 specify application-to-application (data) links that are established by a connection request sequence between the host and CIP. Once established, data messages (IP packets) may flow over these application-application links in accordance with specified CLAW block size and data type parameters.

However, a problem with the conventional CLAW protocol implementations involves the restriction of a CLAW block size to a maximum of 4K bytes and, in particular, the substantial amount of channel bandwidth consumed by overhead associated with such a restricted block size. Another restriction of the CLAW protocol involves the transfer of only one type of data during a single channel operation. The present invention is directed to enhancing the CLAW protocol to achieve increased utilization of the channel through, inter alia, the transfer of different data types within a single CLAW channel operation.

In accordance with the invention, an enhanced CLAW packing protocol is provided that supports the transfer of multiple data types from different sockets/sessions within a single channel operation between the host mainframe and control unit. Broadly stated, multiple logical sublinks are created under a single packed CLAW logical link, wherein each sublink may transport a uniquely identifiable data type as a message from a socket/session. The messages are then concatenated within a single CLAW data block for transfer over a channel coupling the host and control unit. Notably, the maximum size of the CLAW block is increased for each channel operation.

Figure 3:
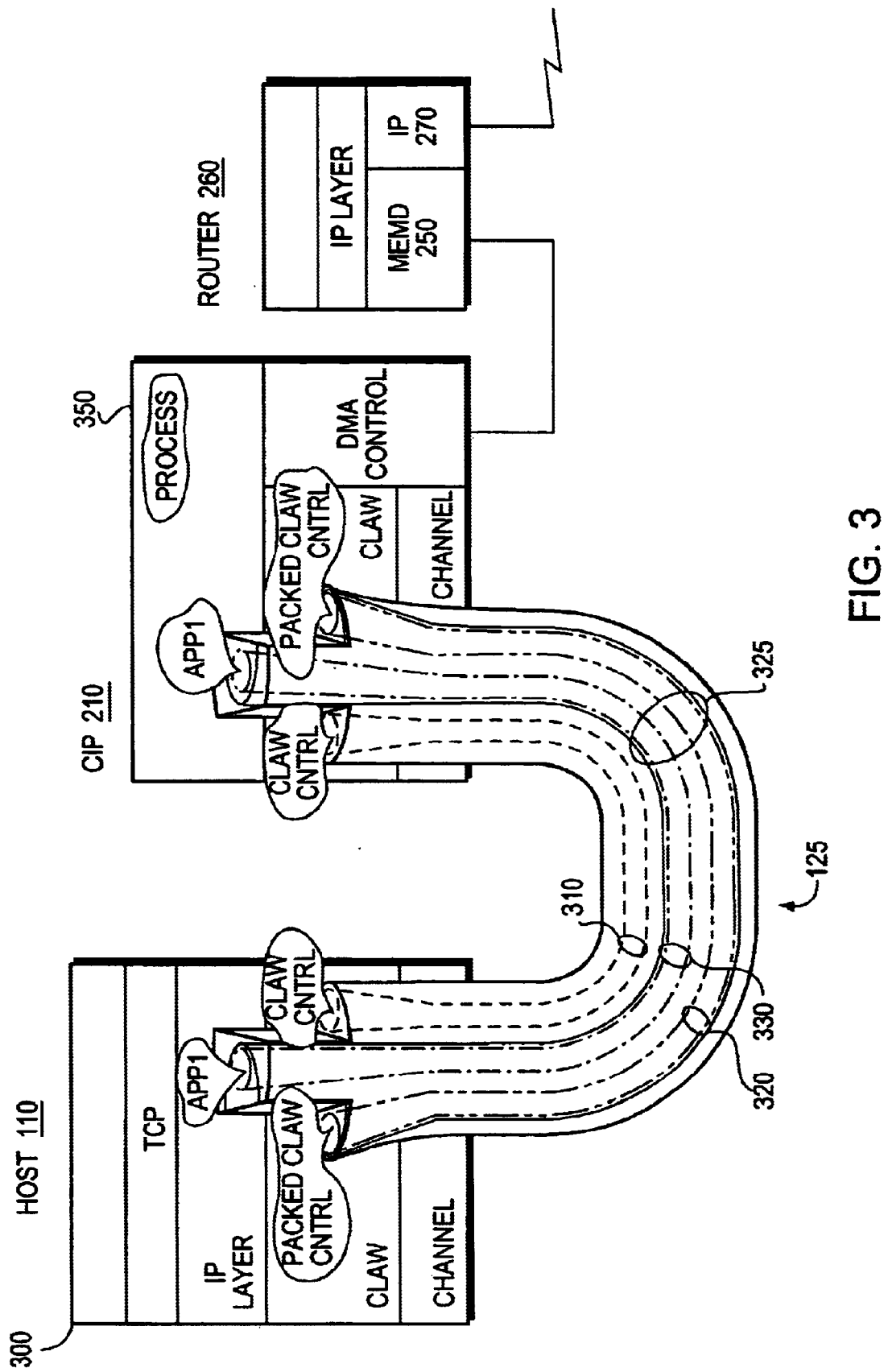
FIG. 3 is a schematic block diagram of CLAW applications within protocol stacks of the host computer and the control unit for performing operations relating to an enhanced CLAW, packing protocol according to the present invention.

FIG. 3 is a schematic block diagram of software entities of protocol stacks 300, 350 within the host computer 110 and the CIP 210, respectively, used to implement the CLAW packing protocol. The entities are preferably CLAW applications residing within lower-level layers (e.g., internetwork and data link layers) of the protocol stacks. As used herein, a CLAW application is similar to a service access point in that it identifies a particular port (or access point) to a higher-level layer in a network node involved in a data exchange. A CLAW control entity (CLAW CNTRL) is provided in each node as an application layered upon a CLAW driver layer (CLAW); the CLAW CNTRL application is configured to handle all CLAW requests.

Figure 4:
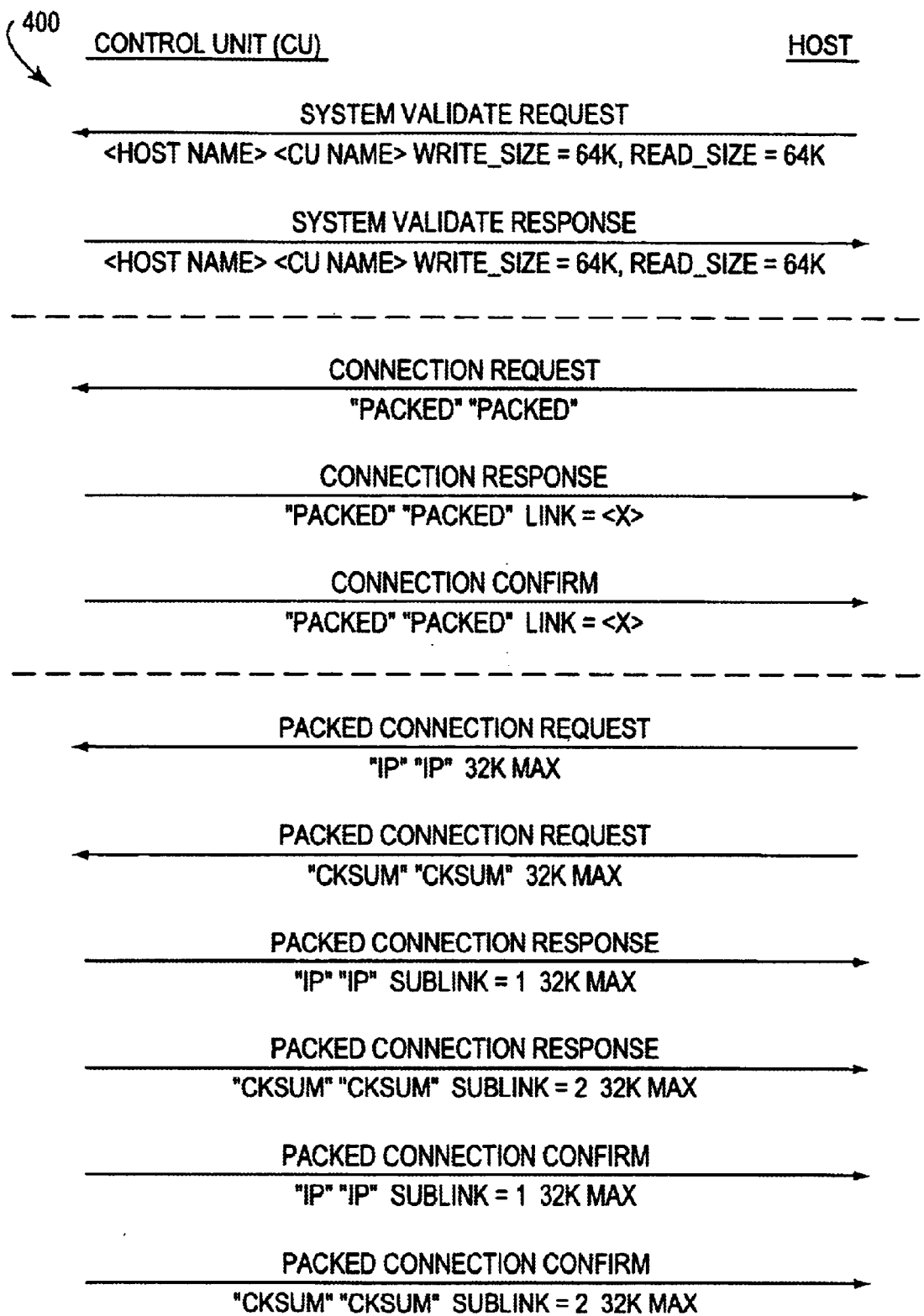
FIG. 4 is a schematic diagram illustrating flows which, in conjunction with the CLAW applications, cooperate to create novel logical sublinks in accordance with the invention.

Establishment of the packed CLAW link begins with a CLAW initialization procedure comprising system validation and connection request flows. These flows create a CLAW control link (logical link 0) which is then used to create the novel packed CLAW logical link. Thereafter, multiple sublinks are created "underneath" the packed link in connection with a CLAW packing connection establishment flow. FIG. 4 is a schematic diagram illustrating flows 400 which, in conjunction with the CLAW applications, cooperate to create these novel sublinks.

A system validate exchange occurs between CLAW CNTRL processes executing on the host and CIP to activate a control link connection (shown as dashed lines 310) over channel 125. The CLAW control link provides the only data that is valid before any other logical links are established. The system validate exchange comprises a system validate request message used to negotiate read and write data (buffer) sizes and to verify that the names on the host and control unit match. The host and control unit names correspond to application processes executing on the host and control unit, respectively. In accordance with the invention, the maximum read and write data (buffer) size that may be advertised is extended from 4K bytes to 64K bytes. It should be noted that, as used herein, 64K bytes represents 65,535 bytes. The system validate request may be issued and exchanged substantially simultaneously by either the host or control unit.

In response to the system validate request, the host or control unit issues a system validate response message that validates the host and control unit application names, and the read and write buffer sizes provided by the request. A positive system validate return code response (e.g., OK) ensures that the applications are "communicating" with the proper entities within the host and control unit. The control unit generally adjusts the read size in its response to match that of the host's system validate request.

Once the control link is activated, the next phase of the initialization procedure is connection establishment, including connection request/connection response message exchanges. In accordance with the invention, the connection request/response sequence is invoked among the CLAW CNTRL processes over link 310 to create a logical CLAW packing link (shown as solid lines 325) for transporting multiple IP datagrams of various data types (checksummed, non-checksummed and/or any other data type) between processes on the host and the CIP within a single CLAW data block.

For the packed logical link of the present invention, the names of the host application and control unit application processes are preferably PACKED and PACKED, respectively. The host is configured for packed CLAW logical linking prior to initialization so that during connection establishment, the PACKED-PACKED processes may be invoked. A connection request message is exchanged between the PACKED processes to "bring-up" a PACKED-PACKED link, which is thereafter confirmed by the exchange of connection response and connection confirm messages. As with the system validate request/response sequence, the connection request/response flows may be issued and exchanged substantially simultaneously by either the host or control unit. If the control unit is configured for CLAW packing, but the host responds negatively to such packing, then the feature may not be implemented.

Upon formation of the packed CLAW link 325, a packed control sublink 0 (shown as dashed-dotted lines 320) is valid for exchanging packed control messages between the host and control unit. The enhanced CLAW packing protocol manifests as an exchange of these packed control messages in accordance with a packed connection establishment sequence to further establish non-zero sublinks "underneath" the packed link 325. Specifically, a packed connection request message is exchanged between PACKED CLAW CNTRL processes over sublink 320 to create logical non-zero, application-application sublinks (shown as dashed-dotted lines 330) for transferring data in response to execution of CCWs of a channel program at the host and CIP. The packed connection request/connection response flows determine logical sublink numbers assigned to those non-zero logical sublinks, each of which defines a type of data transferred between the host and control unit applications, generally designated APP1.

For example, the packed connection request/response flows may be employed to establish a logical IP sublink that transports IP datagram packets in a form wherein the host has performed checksum processing and the control unit need only pass that data from the channel to the network.

The names specified in these packed connection request/response messages are typically IP (host name) and IP (control unit name). The packed connection establishment exchanges may also be used to establish a socket offload logical sublink that effectively displaces the endpoint of socket/session data from the host to the control unit. The names of the host and control unit processes for this latter sublink are preferably IP and API, respectively.

On the other hand to establish an IP checksum offload sublink, the packed connection request/response flows establish a logical sublink that defines IP packet data wherein the IP packets have undergone or will undergo checksum operations by the control unit. Any data forwarded over that logical sublink "pipe" is treated according to the IP checksum offload protocol which specifies checksumming of the TCP/UDP portion of the IP packet to be performed by the control unit. The IP checksum offload protocol is described in copending and commonly assigned U.S. patent application Ser. No. 08/921,158, titled IP Checksum Offload. The host and control unit application names for the IP checksum offload logical sublink are preferably CKSUM and CKSUM.

Referring to FIG. 4, two sublinks are established under the packed CLAW logical link: one for non-checksummed IP packets (IP IP) and the other for control unit checksummed packets (CKSUM CKSUM). Here, the host issues a first packed connection request (IP IP) and a second packed connection request (CKSUM CKSUM); the control unit responds to these requests with packed connection responses, the first of which is directed to, e.g., sublink 1 and the second directed to, e.g., sublink 2. The control unit also sends two packed confirm messages for sublinks 1 and 2. Subsequent packed message transfers associated with these sublinks may include data of both types concatenated within a single channel block of data. Advantageously, this enhancement conserves substantial bandwidth of the channel by reducing the overhead associated with a packed data transfer.

In a packed CLAW link environment, the host may be configured with buffer sizes that are negotiated during the system validate and packed connection request exchanges; these buffer sizes determine the maximum read and write sizes contained within a CLAW data block flow. In general, the host may be configured for multiple of 4K byte buffer sizes up to 64K bytes, thereby enabling packed message exchanges of, e.g., 32K byte or 64K byte using the enhanced CLAW packing protocol. The control unit is preferably configured in a manner that is backward compatible with both the packed message transfer sizes and a more typical MTU transfer size.

During system validate message flows from the host to control unit, for example, the host may specify a buffer size of, e.g., 64K bytes for use during a read operation from the control unit. Similarly, the host may specify that the control unit have at least, e.g., 64K of memory available for write operations from the host to the control unit. Thereafter during packed connection establishment, the host may limit the maximum amount of read and write data contained within a packed message according to the type of sublink, e.g., 4K bytes for the IP/IP or CKSUM/CKSUM sublinks. The read size and write size parameters of the conventional CLAW system validation represent a maximum data transfer size of the channel block between the host and control unit. The maximum transfer size of the individual packed messages per sublink should not be greater than the transfer size negotiated during packed sublink connection establishment. As noted, the control unit may adjust the maximum amount of data that it "packs" based on either the host request (system validate message) or its response (system validate response).

Figure 5:
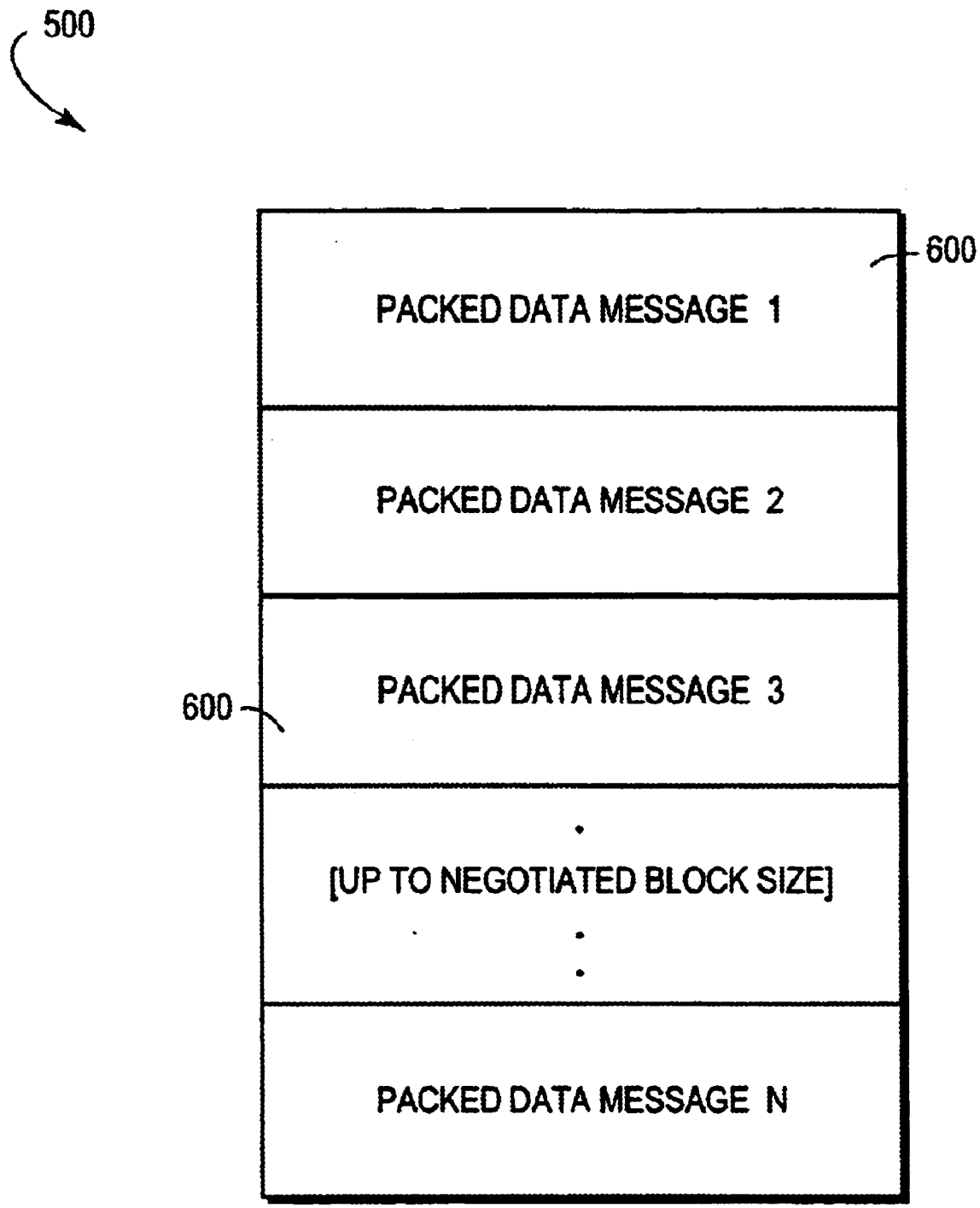
FIG. 5 is a diagram of a packed CLAW data block comprising a concatenation of packed data messages according to the present invention.

Once established, each sublink may transport a packed data message of a particular data type within the same channel operation. The data types are then transferred over the packed CLAW link as a series of packed data messages within a single CLAW data block. FIG. 5 illustrates a channel CLAW data block 500 that essentially comprises a concatenation of packed data messages 600. The size of this "CLAW packed block of data" may extend up to the maximum block size (of 64K bytes) negotiated during system validation; however, it may be desirable to limit the length of a particular packed block of messages to less than the negotiated block size, primarily because of the latency involved waiting for data from, e.g., the network during a read operation.

Figure 6:
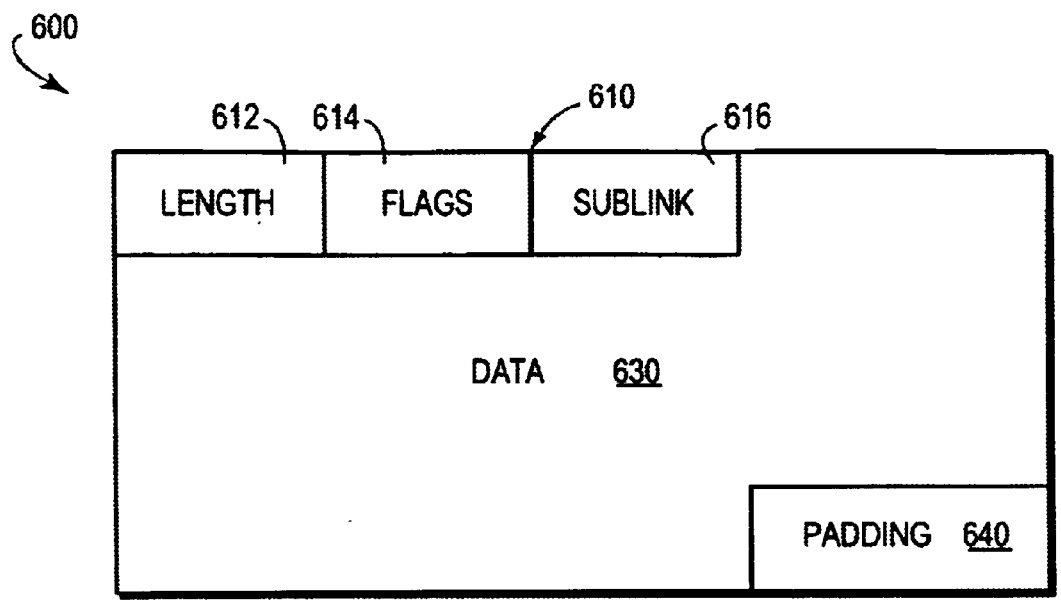
FIG. 6 is a schematic block diagram depicting the format of a packed data message within a packed CLAW data block.

FIG. 6 is a schematic block diagram depicting the format of a packed data message 600 within a packed CLAW data block 500. The packed message 600 preferably comprises 4 bytes of packed header 610 followed by data 630 and, finally, up to 3 bytes of padding 640. The packed header 610 comprises a 2-byte field 612 of length information, a 1-byte field 614 of flags and a 1-byte field 616 containing a sublink number. Note that the packed header is in addition to any header information that may be contained within the data portion 630 of the packed message 600. For example if the data 630 comprises an IP packet, immediately following the packed header is an IP header of the IP packet. The length field 612 specifies the length of the packed data portion 630, whereas the sublink number field 616 specifies the type of data contained in the packed message, e.g., whether the information is IP datagram, socket offload, or IP checksum offload data. The padding 640 comprises information needed to terminate the packed data message in a manner that enables the header of a next packed message to assume a "natural", e.g., 4-byte, alignment.

Figure 7:
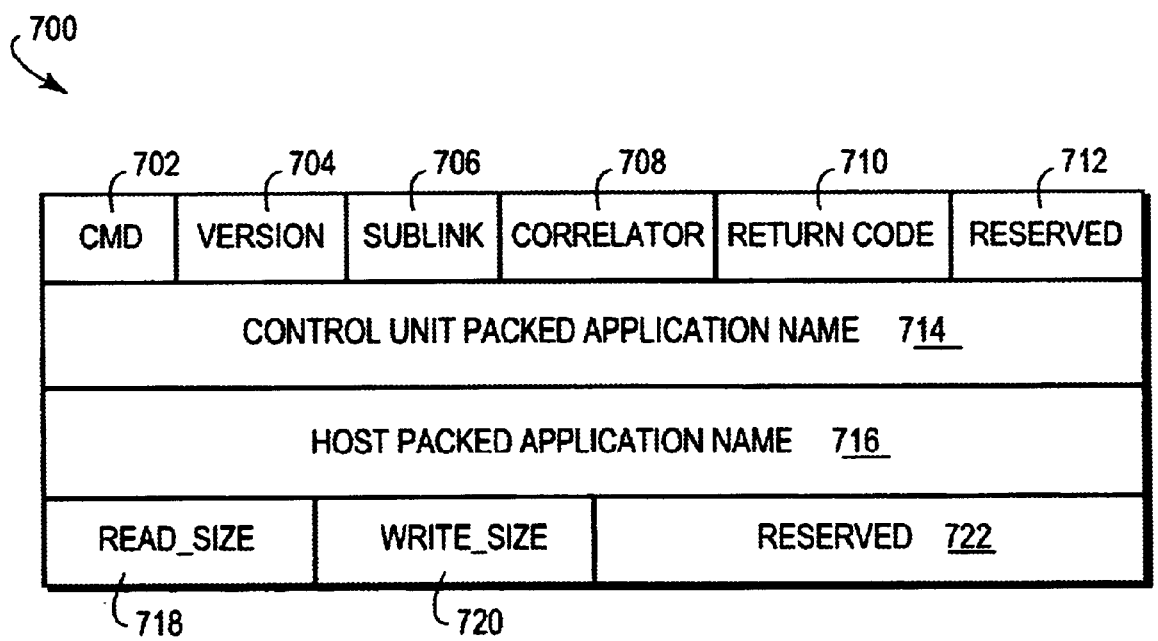
FIG. 7 is a schematic block diagram of a packed control message according to the present invention.

As noted, the packed control messages are sent over the packed control sublink 0 to establish the non-zero logical sublinks. FIG. 7 is a schematic block diagram of a novel packed control message 700. The message preferably embodies a 32-bit format that includes a 1-byte command field 702 whose contents specify the type of control command, such as a packed connection request or connection response. The contents of a 1-byte version field 704 specify the version of the enhanced packed CLAW protocol, while the contents of a 1-byte sublink field 706 identify the particular sublink specified by the packed application names of the control unit and host. Typically, the host initially requests the sublink during a packed connection request, and the control unit responds and confirms the particular sublink.

A 1-byte correlator field 708 contains information used to correlate multiple responses to potentially multiple requests sent by the host (e.g., there can be up to 256 outstanding requests from the host). A 1-byte return code field 710 provides, among other codes, new return codes for packed CLAW linking. One new return code is bad size for a packed connection request when there is no agreement in the size of the read and write transfers between the control unit and the host. Another new return code is application name mismatch which indicates a mismatch in the application names specified by the control message. A 3-byte field 712 and a 4-byte field 722 are reserved for future use. An 8-byte control unit packed application name field 714 contains the application name (represented in ASCII) of the control unit process, whereas an 8-byte host packed application name field 716 contains the application name of the host process represented in ASCII. A 2-byte read size field 718 and a 2-byte write size field 720 contain the negotiated block sizes of the packed CLAW data block.

A feature of the enhanced CLAW packing protocol is the ability to specify a CLAW block size per data type for transfer over a logical link; as noted, the packed CLAW block size may extend up to the maximum block size negotiated during system validation. For example, a maximum packed data size of 4K bytes can be specified for IP data, whereas a maximum size of 32K bytes may be specified for IP checksum offload data. The sizes of the read and write data operations specified in the packed control messages are the maximum amount of data for the particular sublink that is established in accordance with the control message.

An advantage of the invention with respect to conventional CLAW protocol implementations is the ability to concatenate multiple packed messages within a CLAW data block, where the packed messages may be of the same or different type of data. Although each packed message is of a single type, there may be multiple packed messages of the same or different types within a packed CLAW block of data. The novel packed header facilitates such concatenation by enabling efficient determination of the boundary of each individual packed message. Specifically, the length field within the header identifies the length of the packed data field within a packed CLAW block which, in turn, enables fast identification of the end of each message. This type of mechanism does not exist for the socket offload protocol that uses the non-packed CLAW protocol and whose header is associated with an entire chained block of data.

Another difference between the socket offload implementation of the CLAW protocol and the novel packing protocol enhancement is that, with the offload implementation, each chained block of data is associated with the same socket or session (i.e., application level session), whereas the packed data messages of the present invention may originate from multiple application level sessions or sockets. Since all of the data within a chained socket offload CLAW block originates from the same session/socket, there is no need for the boundary-detection mechanism provided by the present invention.

Moreover, the chained data of the socket offload implementation must execute sequentially. That is, if execution of one of the messages stalls for any reason, execution of the remaining messages within the offload block also stalls, thereby obviating independent message processing. Yet independence is required in order to "pack together" multiple messages from different sessions, as specified by the present invention. By definition, each packed message of the inventive packed CLAW block is a session boundary of data from a similar or different session. This advantageously allows independent processing of each packed message under control of the sublink.

In summary, the enhanced CLAW protocol described herein "packs" data messages for not only the same socket endpoint, but for all socket endpoints. Data packing is also not limited to socket offload data, but may extend to any type of data transported within a CLAW block between the host and control unit. Instead of classifying the data at the CLAW link level, the actual data types are classified at the packed CLAW sublink level as, e.g., IP data, IP checksum offload data or any other type of data.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method of transferring multiple data types within a single channel operation over a channel coupling a host mainframe and a control unit of a computer network, the method comprising the steps of:
   creating multiple sublinks from a predetermined logical link used to establish a logical connection between processes executing on the host mainframe and control unit, the sublinks including a plurality of non-zero sublinks, each non-zero sublink capable of transporting a uniquely identifiable data type as a packed data message; and
   concatenating each packed data message within a single packed data block for transfer over the channel to thereby reduce overhead on the channel associated with transferring each packed data message individually.

2. A method of transferring multiple data types within a single channel operation over a channel coupling a host mainframe and a control unit of a computer network, the method comprising the steps of:
   creating multiple sublinks from a predetermined logical link used to establish a logical connection between processes executing on the host mainframe and control unit, the sublinks including a plurality of non-zero sublinks, each non-zero sublink capable of transporting a uniquely identifiable data type as a packed data message, the predetermined logical link having a common link access to workstation (CLAW) packing link;
   concatenating each packed data message within a single packed data block for transfer over the channel to thereby reduce overhead on the channel associated with transferring each packed data message individually;
   forming the CLAW packing link in accordance with a connection request/response exchange sequence between the host mainframe and control unit, the formed CLAW packing link including a valid control sublink; and
   exchanging packed control messages over the control sublink between packed CLAW control processes executing on the host mainframe and control unit in accordance with a packed connection establishment sequence to establish the non-zero sublinks.

3. The method of claim 2 wherein the step of exchanging further comprises the steps of:
   issuing a packed connection request control message from one packed CLAW control process to the other packed CLAW control process;
   returning a packed connection response control message from the other packed CLAW control process to the one packed CLAW control process; and
   sending a packed confirm control message from the other packed CLAW control process to the one packed CLAW control process.

4. The method of claim 3 wherein the step of issuing the packed connection request control message further comprises the step of assigning a logical sublink number to each established non-zero sublink.

5. The method of claim 4 wherein the step of assigning further comprises the step of defining a type of data transferred over each non-zero sublink.

6. The method of claim 5 wherein the single packed data block is a packed CLAW data block and wherein step of concatenating comprises the step of transporting a series of packed data messages within the packed CLAW data block.

7. Apparatus for transferring multiple data types within a single channel operation over a channel coupling a host mainframe and a control unit of a computer network, the apparatus comprising:

a channel connecting the host mainframe to the control unit, the channel including a predetermined logical link used to establish a logical connection between the host mainframe and control unit, the predetermined logical link having a control sublink;

packed control processes executing on the host mainframe and control unit, the packed control processes exchanging packed control messages over the control sublink to create a plurality of application sublinks, each application sublink capable of transporting a uniquely identifiable data type as a packed data message between applications executng on the host mainframe and the control unit; and a packed data block structure containing a concatenation of each packed data message, the packed data block structure adapted for transfer over the channel to thereby reduce overhead on the channel associated with transferring each packed data message individually.

8. Apparatus for transferring multiple data types within a single channel operation over a channel coupling a host mainframe and a control unit of a computer network, the apparatus comprising:

a channel connecting the host mainframe to the control unit, the channel including a predetermined logical link used to establish a logical connection between the host mainframe and control unit, the predetermined logical link having a control sublink;

packed control processes executing on the host mainframe and control unit, the packed control processes exchanging packed control messages over the control sublink to create a plurality of application sublinks, each application sublink capable of transporting a uniquely identifiable data type as a packed data message between applications executing on the host mainframe and the control unit, each packed control message having a sublink field, the sublink field having contents that identify a particular application sublink specified by names of particular applications executing on the host mainframe and control unit; and a packed data block structure containing a concatenation of each packed data message, the packed data block structure adapted for transfer over the channel to thereby reduce overhead on the channel associated with transferring each packed data message individually.

9. The apparatus of claim 7 wherein each packed control message comprises a command field whose contents specify a type of control command, such as one of a packed connection request and packed connection response.

10. Apparatus for transferring multiple data types within a single channel operation over a channel coupling a host mainframe and a control unit of a computer network, the apparatus comprising:

a channel connecting the host mainframe to the control unit, the channel including a predetermined logical link used to establish a logical connection between the host mainframe and control unit, the predetermined logical link having a control sublink;

packed control processes executing on the host mainframe and control unit, the packed control processes exchanging packed control messages over the control sublink to create a plurality of application sublinks, each application sublink capable of transporting a uniquely identifiable data type as a packed data message between applications executing on the host mainframe and the control unit, wherein each packed control message comprises a command field whose contents specify a type of control command, such as one of a packed connection request and packed connection response, and a correlator field that contains information used to correlate multiple responses to respective multiple requests sent between the host mainframe and the control unit; and a packed data block structure containing a concatenation of each packed data message, the packed data block structure adapted for transfer over the channel to thereby reduce overhead on the channel associated with transferring each packed data message individually.

11. The apparatus of claim 10 wherein each packed control message further comprises a return code field containing a return code for packed linking operations in accordance with establishment of logical connections between the host mainframe and control unit.

12. The apparatus of claim 11 wherein each packed control message further comprises a read size field and a write size field, each containing a negotiated block size of the packed data block structure for transfer between the host mainframe and control unit.

13. The apparatus of claim 12 wherein the return code comprises a bad size code for the packed connection request when there is no agreement in the read and write block sizes of the packed data block structure between the host mainframe and control unit.

14. The apparatus of claim 11 wherein each packed control message further comprises (i) a control unit packed application name field containing a name of an application executing on the control unit and (ii) a host packed application name field containing a name of an application executing on the host mainframe.

15. The apparatus of claim 14 wherein the return code comprises an application name mismatch code that indicates a mismatch in the application names specified in the packed control message.

16. Apparatus for transferring multiple data types within a single channel operation over a channel coupling a host mainframe and a control unit of a computer network, the apparatus comprising:

a channel connecting the host mainframe to the control unit, the channel including a predetermined logical link used to establish a logical connection between the host mainframe and control unit, the predetermined logical link having a control sublink;

packed control processes executing on the host mainframe and control unit, the packed control processes exchanging packed control messages over the control sublink to create a plurality of application sublinks, each application sublink capable of transporting a uniquely identifiable data type as a packed data message between applications executng on the host mainframe and the control unit, wherein each packed data message comprises a packed header, a data field and a padding field, the padding field comprising information for terminating the packed data message in a predetermined natural alignment; and a packed data block structure containing a concatenation of each packed data message, the packed data block structure adapted for transfer over the channel to thereby reduce overhead on the channel associated with transferring each packed data message individually.

17. The apparatus of claim 16 wherein the packed header comprises a length field having contents that specifies a length of the data field.

18. Apparatus for transferring multiple data types within a single channel operation over a channel coupling a host mainframe and a control unit of a computer network, the apparatus comprising:

a channel connecting the host mainframe to the control unit, the channel including a predetermined logical link used to establish a logical connection between the host mainframe and control unit, the predetermined logical link having a control sublink;

packed control processes executing on the host mainframe and control unit, the packed control processes exchanging packed control messages over the control sublink to create a plurality of application sublinks, each application sublink capable of transporting a uniquely identifiable data type as a packed data message between applications executing on the host mainframe and the control unit; and a packed data block structure containing a concatenation of each packed data message, the packed data block structure adapted for transfer over the channel to thereby reduce overhead on the channel associated with transferring each packed data message individually, each packed data message having a packed header, a data field and a padding field, the padding field having information for terminating the packed data message in a predetermined natural alignment, and the packed header having a sublink number field containing a sublink value specifying a type of data contained in the packed data message.

19. The apparatus of claim 18 wherein the type of data contained in the packed data message comprises one of datagram data, socket offload data and checksum offload data.

20. The apparatus of claim 7 wherein the packed data block structure is a packed common link access to workstation (CLAW) data block.

21. A method of operating a node, comprising:

establishing a communication channel between a host computer and the node;

establishing a logical link on the communication channel between the host computer and the node;

creating multiple sublinks in the logical link, each sublink establishing a connection between processes executing on the host computer and the node, each sublink capable of transporting a packed data message;

writing a packed header into each of the packed data messages, the packed header having a sublink field, the sublink field indicating a sublink for the packed data message, the sublink associated with a unique data type; and concatenating a plurality of packed data messages within a single packed data block for transfer over the channel, the transfer of the data block reducing overhead as compared with transferring each packed data message separately.

22. The method of claim 21, further comprising:

including a router connected to a computer network in the node;

controlling operation of the router in response to the packed data messages, as the router routes message traffic through the computer network.

23. The method of claim 21, further comprising:

identifying by the sublink field particular applications executing on the host computer and on the node.

24. The method of claim 21, further comprising:

the packed message identifying a process by name executing on the host computer, and the packed message identifying a process by name executing on the node, the packed message thereby providing communication between the identified process on the node and the identified process on the host computer.

25. The method of claim 21, further comprising:

identifying the logical link with a common link access to workstation (CLAW) packing link.

26. The method of claim 25, further comprising:

forming the CLAW packing link in accordance with a connection request/response exchange sequence between the host computer and the node, the formed CLAW packing link including a valid control sublink; and exchanging packed control messages over the control sublink between packed CLAW control processes executing on the host computer and the node in accordance with a packed connection establishment sequence.

27. A node, comprising:

an interface to a communication channel between a host computer and the node;

a logical link process to establish a logical link on the communication channel between the host computer and the node;

a sublink process to create multiple sublinks in the logical link, each sublink establishing a connection between processes executing on the host computer and the node, each sublink capable of transporting a packed data message;

a packed control process to write a packed header into each of the packed data messages, the packed header having a sublink field, the sublink field indicating a sublink for the packed data message, the sublink associated with a unique data type; and a concatenating process to concatenate a plurality of packed data messages within a single packed data block for transfer over the channel, the transfer of the data block reducing overhead as compared with transferring each packed data message separately.

28. The apparatus of claim 27, further comprising:

a router connected to a computer network located in the node;

a process to control operation of the router in response to the packed data messages, as the router routes message traffic through the computer network.

29. The apparatus of claim 27, further comprising:

logic to identify by the sublink field particular applications executing on the host computer and on the node.

30. The apparatus of claim 27, further comprising:

a first field in the packed message to identify a process by name executing on the host computer, and a second field in the packed message for the packed message to identify a process by name executing on the node, the packed message thereby providing communication between the identified process on the node and the identified process on the host computer.

31. The apparatus of claim 27, further comprising:

a process to identify the logical link with a common link access to workstation (CLAW) packing link.

32. The apparatus of claim 31, further comprising:

logic to form the CLAW packing link in accordance with a connection request/response exchange sequence between the host computer and the node, the formed CLAW packing link including a valid control sublink; and exchanging packed control messages over the control sublink between packed CLAW control processes executing on the host computer and the node in accordance with a packed connection establishment sequence.

33. A method for operating a system, comprising:

establishing a node in a computer network;

establishing a host computer;

establishing a communication channel between the host computer and the node;

establishing a logical link on the communication channel between the host computer and the node;

creating multiple sublinks in the logical link, each sublink establishing a connection between processes executing on the host computer and the node, each sublink capable of transporting a packed data message;

writing a packed header into each of the packed data messages, the packed header having a sublink field, the sublink field indicating a sublink for the packed data message, the sublink associated with a unique data type; and concatenating a plurality of packed data messages within a single packed data block for transfer over the channel, the transfer of the data block reducing overhead as compared with transferring each packed data message separately.

34. The method of claim 33, further comprising:

including a router connected to the computer network in the node;

controlling operation of the router in response to the packed data messages, as the router routes message traffic through the computer network.

35. A system, comprising:

a node;

a host computer;

a communication channel between the host computer and the node;

a logical link process to establish a logical link on the communication channel between the host computer and the node;

a sublink process to create multiple sublinks in the logical link, each sublink establishing a connection between processes executing on the host computer and the node, each sublink capable of transporting a packed data message;

a packed control process to write a packed header into each of the packed data messages, the packed header having a sublink field, the sublink field indicating a sublink for the packed data message, the sublink associated with a unique data type; and a concatenating process to concatenate a plurality of packed data messages within a single packed data block for transfer over the channel, the transfer of the data block reducing overhead as compared with transferring each packed data message separately.

36. The system of claim 35, further comprising:

a router located in the node, the router connected to a computer network;

a process to control operation of the router in response to the packed data messages, as the router routes message traffic through the computer network.

37. A node, comprising:

an interface to a communication channel between a host computer and the node;

a logical link process to establish a logical link on the communication channel between the host computer and the node;

means for creating multiple sublinks in the logical link, each sublink establishing a connection between processes executing on the host computer and the node, each sublink capable of transporting a packed data message;

means for writing a packed header into each of the packed data messages, the packed header having a sublink field, the sublink field indicating a sublink for the packed data message, the sublink associated with a unique data type; and a concatenating process to concatenate a plurality of packed data messages within a single packed data block for transfer over the channel, the transfer of the data block reducing overhead as compared with transferring each packed data message separately.

38. A computer readable media comprising:

the computer readable media having instructions written thereon, the instructions for execution in a processor for practice of the method of claim 1 or claim 21 or claim 33.

39. Electromagnetic signals propagating on a computer network, comprising:

the electromagnetic signals carrying instructions for execution in a processor for practice of the method of claim 1 or claim 21 or claim 33.

* * * * *